United States Patent
Cho et al.

(10) Patent No.: US 8,396,962 B2
(45) Date of Patent: Mar. 12, 2013

(54) GAME GRAMMAR-BASED PACKET CAPTURE AND ANALYSIS APPARATUS AND METHOD FOR CONDUCTING GAME TEST

(75) Inventors: Chang Sik Cho, Daejeon (KR); Su Young Bae, Daejeon (KR); Kang Min Sohn, Daejeon (KR); Chang Joon Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 579 days.

(21) Appl. No.: 12/652,856

(22) Filed: Jan. 6, 2010

(65) Prior Publication Data
US 2011/0130205 A1    Jun. 2, 2011

(30) Foreign Application Priority Data
Dec. 1, 2009   (KR) ................. 10-2009-0118063

(51) Int. Cl.
G06F 15/173   (2006.01)

(52) U.S. Cl. .......................................... 709/224; 463/42
(58) Field of Classification Search .................. 709/224; 463/42
See application file for complete search history.

(56) References Cited

U.S. PATENT DOCUMENTS

| | | | |
|---|---|---|---|
| 7,447,622 B2 * | 11/2008 | Arama et al. ................... | 703/23 |
| 2010/0009758 A1 * | 1/2010 | Twitchell, Jr. .................. | 463/42 |
| 2010/0173695 A1 * | 7/2010 | Hutcheson et al. ............. | 463/23 |

FOREIGN PATENT DOCUMENTS

| KR | 1020060071665 A | 6/2006 |
|---|---|---|
| KR | 1020070060378 A | 6/2007 |
| KR | 1020090065747 A | 6/2009 |

OTHER PUBLICATIONS

Ju Young Kim et al., "Methodology for Verifying the load limit point and bottle-neck of a game server using the large scale virtual clients," ICACT 2008, Feb. 17-20, 2008, pp. 382-386.
Changsik Cho et al., "The Design of Game Packet Capturing and Analyzing Tool for Game Server Load Testing," Korea Game Society, Oct. 30, 2009.

* cited by examiner

*Primary Examiner* — Thomas Dailey

(57) ABSTRACT

A game grammar-based packet capture and analysis apparatus for conducting game test, includes: a packet capture unit for capturing packets of game data transmitted and received between a game client and a game server; a packet analysis unit for analyzing the packets captured by the packet capture unit to generate a game grammar based on analyzed results. Further, the game grammar-based packet capture and analysis apparatus includes a load generation unit for generating packets in compliance with the game grammar to apply the packets to the game server as a load.

17 Claims, 3 Drawing Sheets

GAME GRAMMAR-BASED PACKET CAPTURE AND ANALYSIS APPARATUS AND METHOD FOR CONDUCTING GAME TEST

FIELD OF THE INVENTION

The present invention relates to a method of testing the quality of an online game; and, more particularly, to a game grammar-based packet capture and analysis apparatus and method for conducting game test which is capable of enabling the verification of the entire quality of a game as well as the performance of a load test on the game server.

BACKGROUND OF THE INVENTION

A conventional load generation system based on virtual users just focuses on performing load and stress tests. That is, the conventional load generation system is operated in a manner to capture specific packet samples of an actual client, appropriately manipulate the captured specific packet samples, and transmit a large amount of data to a server.

Due to the characteristics of an online game, there are cases where information, such as an ID, a password and a session key value, need to vary on a per-session basis. For this purpose, simple packet manipulation is performed. That is, different types of content can be applied to respective sessions by manipulating specific items in a previously captured packet list, thereby allowing the generation of a large number of simple and repetitive packets.

Meanwhile, a load generation system based on a virtual user which is capable of capturing packets during an actual game and of generating new packets by performing simple manipulation on the captured packets has been researched. Furthermore, research into the addition of a structure for constructing a virtual network line to a simulation environment to test the stability of a server in a network environment similar to an actual one has been conducted.

However, since the conventional load generation system based on a virtual user is configured to use captured packets without changing them or to regenerate loads by using simple manipulation, the utility of the test is low. That is, only a simple type of load test can be conducted. As a result, since an online game server uses more complicated game logic than that of a general server application such as a web service, it is difficult to conduct a complicated logic stability test using a general packet reuse method.

SUMMARY OF THE INVENTION

In view of the above, the present invention provides a game grammar-based packet capture and analysis apparatus and method for conducting game test, which is capable of, for an online game requiring a quality test, capturing packets transmitted and received between a game client and a game server, analyzing the captured packets, generating a game grammar including packet generation rules, protocols and actions, then generating packets regarding various game patterns of users in compliance with the game grammar, and testing a game server using the generated packets, thereby enabling the verification of the entire quality of a game as well as the performance of a load test on the game server.

Further, the present invention provides a game grammar-based packet capture and analysis apparatus and method for conducting game test, which can set up a virtual user system capable of the verification of the entire quality of a game as well as the performance of a load test on the basis of a game grammar. The virtual user system is capable of generating packet data on the basis of the analyzed game grammar, thereby enabling an application without setting up a user system again even when a game to be tested has been altered.

In accordance with a first aspect of the present invention, there is provided a game grammar-based packet capture and analysis apparatus for conducting game test, including: a packet capture unit for capturing packets of game data transmitted and received between a game client and a game server; a packet analysis unit for analyzing the packets captured by the packet capture unit to generate a game grammar based on analyzed results; and a load generation unit for generating packets in compliance with the game grammar to apply the packets to the game server as a load.

In accordance with a second aspect of the present invention, there is provided a game grammar-based packet capture and analysis method for conducting game test, including: capturing packets of game data transmitted and received between a game client and a game server; analyzing the captured packets to generate a game grammar based on analyzed results; and generating packets in compliance with the game grammar to apply the packets to the game server as a load.

In accordance with an embodiment of the present invention, in the analysis of game grammar-based packets for conducting a game test, packets transmitted and received between the game client and the game server are captured, the captured packets are analyzed, protocols between the game client and the game server are defined, a game grammar including packet generation rules, protocols and actions is generated, and the packets generated in compliance with the game grammar are applied to the game server as a load, thereby making it possible to test the game server. Further, unlike the conventional technology for regenerating a load by the simple manipulation of the captured packets to conduct only a load test, a game grammar is generated by analyzing packets, packets regarding various game patterns of users are generated in compliance with the game grammar, and a game server using the generated packets is tested, thereby making it possible to verify the entire quality of a game as well as to perform a load test on the game server.

BRIEF DESCRIPTION OF THE DRAWINGS

The objects and features of the present invention will become apparent from the following description of embodiments given in conjunction with the accompanying drawings, in which.

DETAILED DESCRIPTION OF THE EMBODIMENTS

Hereinafter, embodiments of the present invention will be described in detail with reference to the accompanying drawings which form a part hereof.

Figure 1:
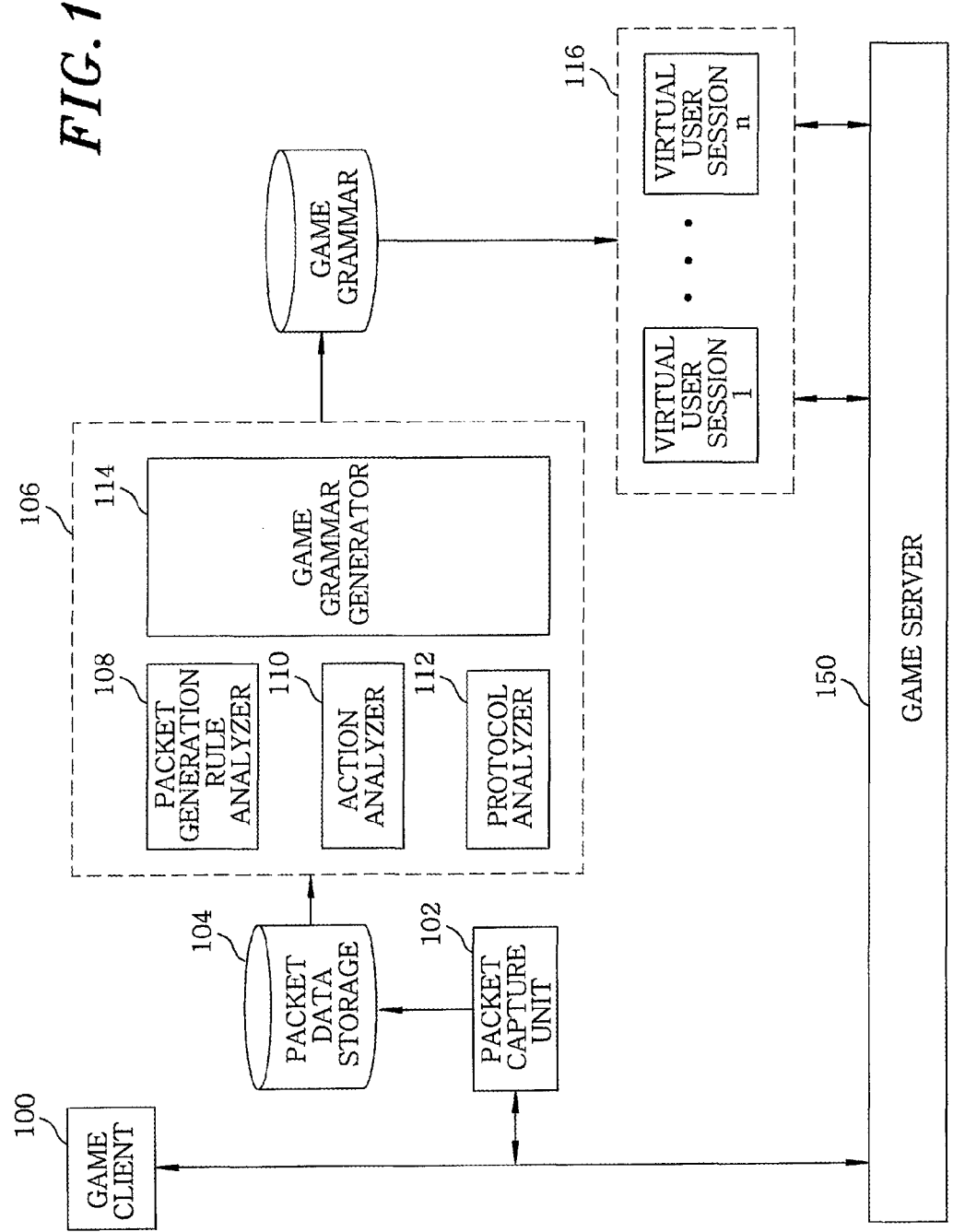
FIG. 1 is a block diagram showing the detailed construction of a game grammar-based packet capture and analysis apparatus for carrying out game tests in accordance with an embodiment of the present invention.

FIG. 1 is a block diagram showing the detailed construction of a game grammar-based packet capture and analysis apparatus for carrying out game tests in accordance with the embodiment of the present invention. The packet capture and analysis apparatus the present invention includes a packet capture unit 102, a packet analysis unit 106, and a load generation unit 116.

The packet capture unit 102 captures actual game data between a game client 100 and a game server 150. The packet capture unit 102 can set the target Internet Protocol (IP) address and port number of packet capture and information about protocol such as the Transmission Control Protocol (TCP) or the User Datagram Protocol (UDP) for a packet data filtering. The collected packet data is stored in packet data storage 104.

The packet analysis unit 106 is a device for analyzing packet data stored in the packet data storage 104 and creates analysis results in the form of a game grammar, and includes a packet generation rule analyzer 108, an action analyzer 110, a protocol analyzer 112, and a game grammar generator 114.

The packet generation rule analyzer 108 analyzes various rules regarding the generation of game packets, such as the entire structure of a packet, header data generation rules, encryption rules, game packet language encoding rules, and time stamp rules.

The protocol analyzer 112 analyzes transmission and reception protocols between the game server 150 and the game client 100 using the respective packets of a game. The action analyzer 110 groups a series of packets into a group to define the grouped packets as a single action, such as movement, battle, and item trade.

The game grammar generator 114 generates analyzed packet generation rules, protocols and actions in the form of a grammar. Here, the game grammar generator 114 also stores the game grammar generated as described above in eXtensible Markup Language (XML).

The load generation unit 116 is a unit for generating an actual load. The load generation unit 116 generates packet data suitable for each game by referring to a game grammar generated by the analysis of the packet analysis unit 106 and generate loads on the game server 150.

Here, the load generation unit 116 generates a plurality of virtual user sessions, generates packets suitable for the game grammar by the generated virtual user sessions, applies the generated packets to the game server 150 as loads, and varies the number of virtual user sessions depending on the load required to perform a game test.

Here, the term "a plurality of virtual user sessions" refers to a plurality of network sessions, and also refers to a plurality of users. A plurality of users is generated so that an effect in which a large number of users is generated, thereby achieving communications.

An operation in which the packet analysis unit 106 generates a game grammar by analyzing packets captured between the game client 100 and the game server 150 will be described in detail below.

First, the game grammar includes packet generation rules, protocols, and actions. The packet generation rule analyzer 108 defines header data generation rules, encryption rules, game packet language encoding rules and time stamp rules by analyzing the entire structure of packets captured by the packet capture unit 102, thereby defining schematic rules required for the generation of packets.

Here, the grammar regarding the entire structure of a packet and header data generation rules is the same as in a packet structure exemplified in the following Example 1. The entire structure of a packet includes a header, a protocol Identity (ID), and a parameter, and the header data includes a time stamp and the length of a packet.

Example 1

PACKET_STRUCTURE::HEADER(TYPE,SIZE):: PROTOCOL_ID (TYPE,SIZE)::PROTOCOL_PARAMETER(TYPE,SIZE)
PACKET_HEADER::TIMESTAMP(TYPE,SIZE):: LENGTH(TYPE,SIZ E)

When packet generation rules are defined by the packet generation rule analyzer 108, a protocol for transmitting and receiving packets between the game client 100 and the game server 150 is analyzed by the protocol analyzer 112.

The protocol defines message transmission and reception rules for packet data between the game client 100 and the game server 150. Here, the protocol includes an ID and a parameter. Here, a protocol ID includes the type and size of an ID, and a parameter is represented to indicate whether it has been defined in a virtual user system. Protocol grammar is defined by the following Example 2 as follows:

Example 2

PROTOCOL_ID((TYPE,SIZE))##DEFINED_ELEMENT((TYPE,SIZE, PROPERTY,OPERATION))## . . . ##UNDEFINED_ELEMENT((TYPE,COUNT,VA LUE))##

When the transmission and reception protocol between the game client 100 and the game server 150 is defined as described above, actions are defined by the action analyzer 110.

An action is used to group a series of protocol packets into a group and define the group as abstract behavior such as movement, battle or item trade. An action is represented by a name, a protocol ID, and a time rule. Action grammar is defined by Example 3 as follows:

Example 3

ACTION_NAME::SEND PROTOCOL1::WAIT 3:: RECEIVE PROTOCOL2:: . . . ##

Figure 2:
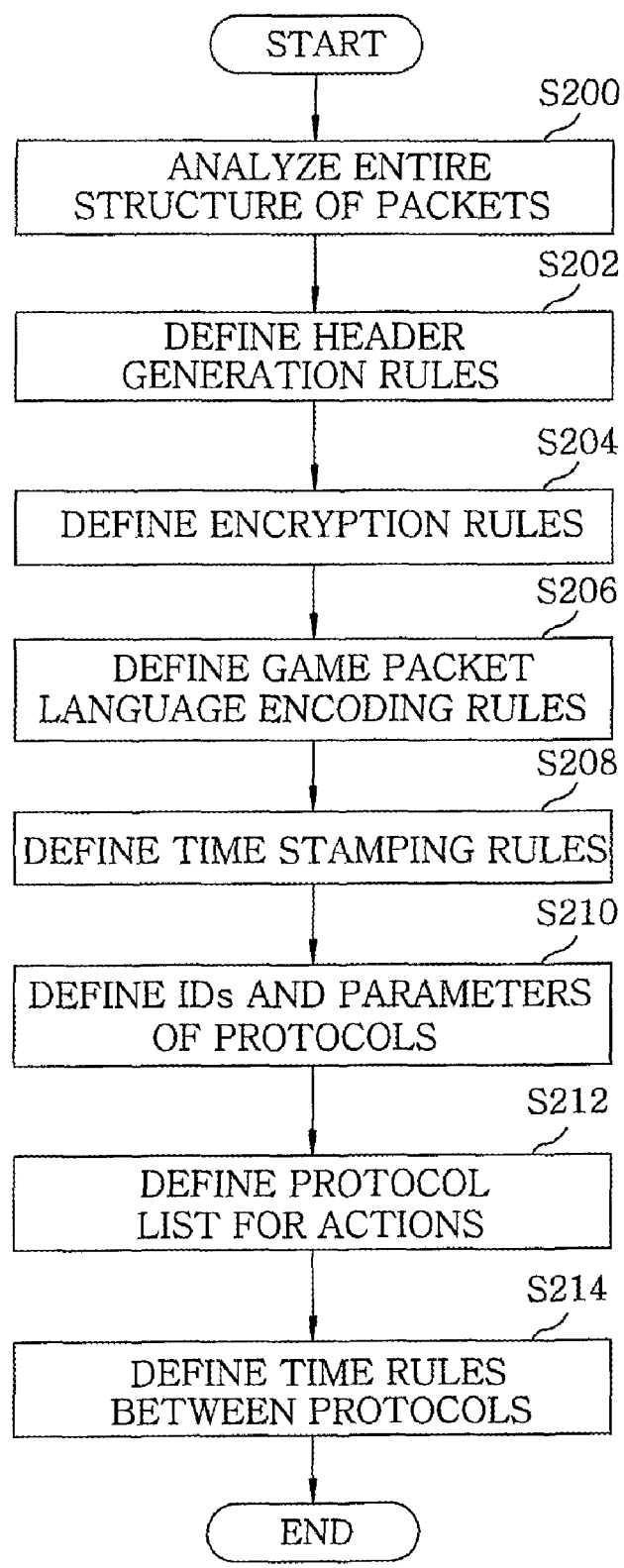
FIG. 2 is a flow chart showing the control flow of an operation in which a packet analysis unit analyzes packets in accordance with the embodiment of the present invention.

FIG. 2 is a flow chart showing the control flow of an operation in which the packet analysis unit 106 analyzes packets captured between the game client 100 and the game server 150 and then generates a game grammar in accordance with an embodiment of the present invention. Referring to FIGS. 1 and 2, the embodiment of the present invention will be described in detail below.

When packets transmitted and received between the game client 100 and the game server 150 are captured to be applied by the packet capture unit 102, the packet generation rule analyzer 108 then analyzes the entire structure of the packets captured by the packet capture unit 102 in step S200.

Thereafter, the packet generation rule analyzer 108 sequentially defines packet header generation rules, encryption rules, game packet language encoding rules, and time stamp rules by analyzing the entire structure of the packets in steps S202 to S208.

When the packet generation rules are analyzed by the packet generation rule analyzer 108 in such a way that packet header generation rules, encryption rules, game packet language encoding rules and time stamp rules are defined by analyzing the entire structure of the packet, the protocol analyzer 112 defines a protocol grammar for each packet.

That is, the protocol analyzer 112 defines the IDs and parameters of transmission and reception protocols between the game client 100 and the game server 150 in step S210.

Thereafter, after the analysis of the transmission and reception protocols between the game client 100 and the game server 150 has been completed by the protocol analyzer 112 as described above, the action analyzer 110 defines actions by combining the packet generation rules generated by the packet generation rule analyzer 108 with the protocols between the game client 100 and the game server 150.

That is, the action analyzer 110 defines a protocol list for actions and describes time rules between respective protocols in steps S212 to S214.

Accordingly, the game grammar generator 114 can generate a game grammar between the game client 100 and the game server 150 using the packet generation rules, the protocol information between the game client 100 and the game server 150, and the action definition, which are defined as described above.

Figure 3:
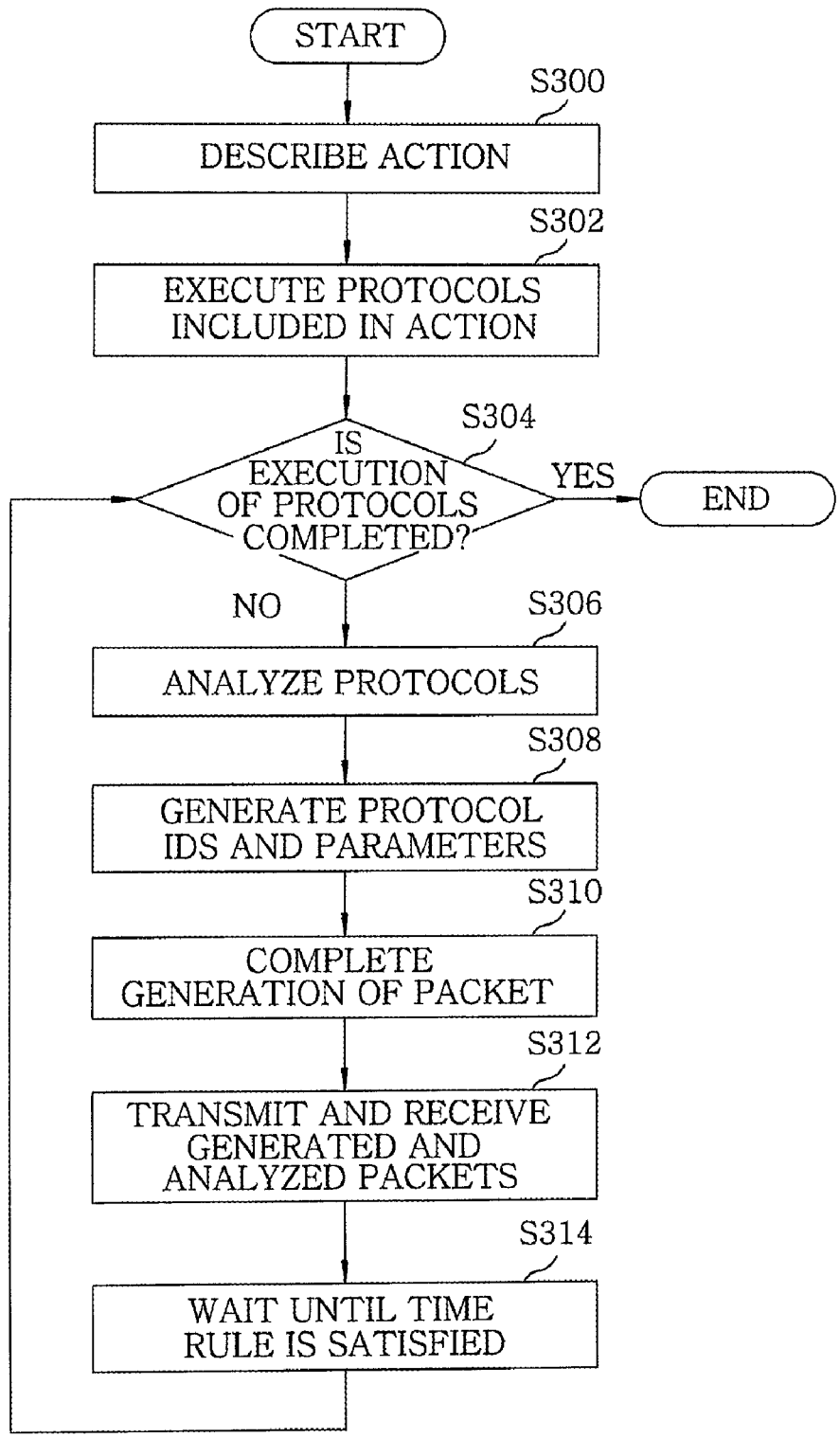
FIG. 3 is a flow chart showing the control flow of an operation in which a load generation unit generates game packets to conduct a test in accordance with the embodiment of the present invention.

FIG. 3 is a flow chart showing the flow of the control flow of an operation in which the load generation unit 116 of the packet capture and analysis apparatus regenerates game packets in accordance with an embodiment of the present invention. Referring to FIGS. 1 and 3, the embodiment of the present invention will be described in detail below.

First, the load generation unit 116 describes an action using the game grammar generated by the packet analysis unit 106, in accordance with the scenario of a game to be tested between the game client 100 and the game server 150 in step S300.

Thereafter, the load generation unit 116 analyzes the above-described action to start transmitting and receiving protocols included in the action in step S302.

Thereafter, the load generation unit 116 checks whether the performance of all the protocols included in the action has been completed and, if the performance of all the protocols included in the action has been completed, terminates the operation of generating a load on the game server 150 in step S304.

On the other hand, if the performance of all the protocols included in the action has not completed, the load generation unit 116 proceeds from step S304 to step S306 to analyze a current protocol.

Thereafter, the load generation unit 116 generates a protocol ID and a parameter such that they are suitable for the game grammar generated by the packet analysis unit 106 in step S308, and completes the generation of a packet by referring to the packet generation rules, such as header rules or game packet language encoding rules in step S310.

Thereafter, the load generation unit 116 transmits and receives the generated and analyzed packet to/from the game server 150 in step S312, in which case, if a time rule, such as a delay, exists between the transmission and reception of a protocol, the load generation unit 116 waits until the time rule is satisfied in step S314.

Thereafter, the load generation unit 116 returns to step S304, and repeats steps S304 to S314 until the performance of all the protocols defined in the action has been completed.

As described above, the present invention does not only include load test functionality in very simple form, but also includes quality test functionality in order to test the quality of complicated game logic, such as movement, battle, item trade, and party play. For this purpose, the present invention is not configured to simply and partially manipulate captured packets, but is configured to define a grammar which enables a user to test a game in accordance with a scenario.

The virtual user system is capable of automatically generating game packets in compliance with defined grammar and, therefore, is capable of handling complicated game logic.

Furthermore, the virtual user system can be easily applied to the case where a game to be tested has been altered.

Since the virtual user system is constructed so that when a game grammar is newly input, packet data can be generated based on the input game grammar, the virtual user system can be easily applied to a general-purpose game as well as to a specific game. That is, when a game to be tested has been altered, newly defining a game grammar in the packet analysis system is enough. Accordingly, a new game test can be easily conducted using packet generation rules for the new game grammar. Accordingly, the virtual user system can be applied to various games as well as a specific game in a universal fashion.

While the invention has been shown and described with respect to the embodiments, it will be understood by those skilled in the art that various changes and modifications may be made without departing from the scope of the invention as defined in the following claims.

What is claimed is:

1. A game grammar-based packet capture and analysis apparatus for conducting game test, comprising:
    a packet capture unit for capturing packets of game data transmitted and received between a game client and a game server;
    a packet data storage unit comprising a non-transitory computer readable medium configured to store the packets of game data;
    a packet analysis unit for analyzing the packets captured by the packet capture unit to generate a game grammar based on analyzed results; and
    a load generation unit for generating packets in compliance with the game grammar to apply the packets to the game server as a load, wherein the packet analysis unit includes:
        a packet generation rule analyzer for defining packet generation rules by analyzing an entire structure of the packets;
        an action analyzer for grouping a series of packets into a group to define the group as an action of a game;
        a protocol analyzer for analyzing protocols of communication between the game client and the server by analyzing the packets; and
        a game grammar generator for generating the game grammar using the packet generation rules, the actions and the protocols.

2. The game grammar-based packet capture and analysis apparatus of claim 1, wherein the packet generation rule analyzer defines the packet generation rules by analyzing a header of each of the packets, a protocol ID and a parameter in the entire structure of the packets.

3. The game grammar-based packet capture and analysis apparatus of claim 1, wherein the packet generation rule analyzer defines header data generation rules, encryption rules, game packet language encoding rules, and time stamp rules after analyzing the entire structure of the packets.

4. The game grammar-based packet capture and analysis apparatus of claim 1, wherein the action analyzer groups the series of packets into a group to define the group as an action including movement, battle and item trade.

5. The game grammar-based packet capture and analysis apparatus of claim 4, wherein the action is defined using a name of the action, a protocol ID and a time rule.

6. The game grammar-based packet capture and analysis apparatus of claim 1, wherein the protocol analyzer analyzes a protocol for communication between the game client and the server using a header of the packet, a protocol ID and a parameter obtained by the analysis of the entire structure of the packet.

7. The game grammar-based packet capture and analysis apparatus of claim 1, wherein the game grammar generator stores into memory the generated game grammar in eXtensible Markup Language (XML).

8. The game grammar-based packet capture and analysis apparatus of claim 1, wherein the load generation unit generates a plurality of virtual user sessions and generates packets suitable to the game grammar using the generated virtual user sessions to apply the packets to the game server as a load.

9. The game grammar-based packet capture and analysis apparatus of claim 8, wherein the load generation unit variably adjusts the number of virtual user sessions depending on a load required for the game test.

10. A game grammar-based packet capture and analysis method, comprising:
   capturing packets of game data transmitted and received between a game client and a game server;
   analyzing the captured packets to generate a game grammar based on analyzed results; and
   generating packets in compliance with the game grammar to apply the packets to the game server as a load, wherein the generating a game grammar includes:
   defining packet generation rules by analyzing an entire structure of the packets;
   grouping a series of packets into a group to define the group as an action of a game;
   defining protocols of communication between the game client and the server by analyzing the packets;
   generating the game grammar using the packet generation rules, actions and the protocols.

11. The game grammar-based packet capture and analysis method of claim 10, wherein the packet generation rules are defined by analyzing a header of each of the packets, a protocol ID and a parameter in the entire structure of the packets.

12. The game grammar-based packet capture and analysis method of claim 10, wherein said defining the packet generation rules comprises:
   defining header data generation rules of the packets;
   defining encryption rules of the packets;
   defining game packet language encoding rules by analyzing the packets; and
   defining time stamp rules by analyzing header data of the packets.

13. The game grammar-based packet capture and analysis method of claim 10, wherein said grouping the series of packets into the group to define the group as an action of a game comprises:
   grouping the series of packets into a group based on the packet generation rules; and
   defines the group as an action, including—movement, battle and item trade, by analyzing characteristics of the grouped packets.

14. The game grammar-based packet capture and analysis method of claim 13, wherein the action is defined using a name of the action, a protocol ID and a time rule.

15. The game grammar-based packet capture and analysis method of claim 10, wherein the generating packets to the game server as a load comprises:
   generating a plurality of virtual user sessions;
   generating packets suitable to the game grammar by the virtual user sessions; and
   transmitting the generated packets to the game server and generating a load on the game server.

16. The game grammar-based packet capture and analysis method of claim 15, wherein the virtual user sessions are configured such that the number of virtual user sessions generated depending on a load required for the game test is variably adjusted.

17. The game grammar-based packet capture and analysis method of claim 10, wherein the game grammar is stored in XML.

* * * * *